United States Patent [19]
Wiener

[11] Patent Number: 5,374,931
[45] Date of Patent: Dec. 20, 1994

[54] RADAR TARGET VELOCITY ESTIMATOR

[75] Inventor: Alan I. Wiener, Lexington, Mass.

[73] Assignee: Raytheon Company, Lexington, Mass.

[21] Appl. No.: 457,620

[22] Filed: Dec. 27, 1989

[51] Int. Cl.$^5$ ............................................. G01S 13/524
[52] U.S. Cl. ................................... 342/115; 342/194
[58] Field of Search ................ 342/110, 115, 194, 195

[56] References Cited

U.S. PATENT DOCUMENTS

| | | | |
|---|---|---|---|
| 3,935,572 | 1/1976 | Broniwitz et al. | 342/107 X |
| 3,987,442 | 10/1976 | McLeod, Jr. | 341/194 X |
| 4,106,019 | 8/1978 | Alexander et al. | 342/110 X |
| 4,110,753 | 8/1978 | Sirven | 342/115 |
| 4,137,532 | 1/1979 | Taylor, Jr. et al. | 342/194 X |
| 4,137,533 | 1/1979 | Briechle et al. | 342/194 X |
| 4,816,833 | 3/1989 | Ferguson et al. | 342/95 |
| 4,910,465 | 3/1990 | Dillman | 328/133 |

*Primary Examiner*—Gilberto Barrón, Jr.
*Attorney, Agent, or Firm*—Walter F. Dawson

[57] ABSTRACT

A radar target velocity estimator apparatus and method for computing a radial velocity of radar targets from differences in Doppler frequency shift between pulse-returns of multi-pulse waveforms. The velocity estimator uses Doppler frequency shift which is obtained from a finite impulse response (FIR) filter in combination with logarithm tables stored in read-only-memory (ROMs) to calculate the target's velocity. The estimation process requires the calculation of each complex FIR filter value twice during a pulse repetition interval; once for returns of a leading set of radar pulses and then for a trailing set. The estimated velocity is proportional to the phase difference between each corresponding pair of filter values. The estimate is a function of the arctangent of the quotient of the in-phase component of the complex value divided by the quadrature component.

14 Claims, 2 Drawing Sheets

RADAR TARGET VELOCITY ESTIMATOR

The Government has rights to this invention pursuant to Contract No. N00014-86-C-2229 awarded by the Department of the Navy.

BACKGROUND OF THE INVENTION

This invention relates to radar signal processing and in particular to an apparatus and method for estimating the velocity of a target from differences in a Doppler frequency shift between radar pulse returns of multipulse waveforms.

A pulsed radar system that extracts Doppler frequency shift of return radar pulses for the purpose of detecting moving targets and determining their radial velocity is referred to as a pulse Doppler radar. A pulse Doppler radar transmits, repetitively, modulated pulses for a certain time duration, which is referred to as the dwell time of the radar. The time period between each pulse or modulation is the interpulse period, and determines the pulse repetition frequency (PRF). It is common practice for the interpulse periods to be varied, thereby providing several pulse repetition frequencies or PRF's. Such radar systems typically have a relative high PRF in order to prevent ambiguities in the Doppler frequency shift.

A radar system and particularly a surveillance or search radar is used to detect aircraft targets and to determine ranges and bearing of such aircraft. The radar characteristics such as power, pulse width and pulse repetition frequency vary depending on the expected location of a target to be detected. However, certain detected targets that appear on a radar display are of more concern than others. For instance, in military applications it is important to not only detect a target, but also to determine the amount of threat a particular target represents. A good indication of the amount of threat is the measurement of the radial velocity of the target in order to determine if the target is rapidly heading in your direction is desirable to minimize the amount of electronic hardware required to determine such a velocity.

SUMMARY OF THE INVENTION

An apparatus for estimating the radial velocity of a radar target requiring a minimum of electronic hardware is provided comprising a first vector input generated by processing a plurality of leading sweeps of radar data in a first finite impulse response (FIR) filter means, a second vector input generated by processing a plurality of trailing sweeps of radar data in a second finite impulse response (FIR) filter means, means, coupled to the first vector input and the second vector input for determining the phase difference between corresponding pairs of the first vector input and the second vector input, and means coupled to the phase difference determining means for multiplying the phase difference by a velocity per cycle of phase factor ($V_B$) for determining the radar target velocity. The first vector input comprises data in rectangular coordinates comprising an in-phase value and a quadrature value. The second vector input comprises data in rectangular coordinates comprising an in-phase value and a quadrature value. The phase difference determining means computes a phase of the first vector input during a first portion of a clock signal and a phase of the second vector input during a second portion of the clock signal. The phase of the first vector input and the second vector input is determined by logarithmic means by solving an identity of PHASE=ARCTAN [ANTILOG (LOG Q−LOG I)]. The phase determining means further comprises decoding means for determining the phase of the first vector input and the second vector input for any quadrant of a complex plane.

In accordance with the present invention an apparatus for estimating a radar target velocity is provided comprising: a first vector input having an in-phase (I) value and a quadrature (Q) value generated by processing a plurality of leading sweeps of radar data in a first finite impulse response (FIR) filter means, a second vector input having an in-phase value and a quadrature (Q) value generated by processing a plurality of trailing sweeps of radar data in a second finite impulse response (FIR) filter means, means for gating the in-phase (I) values of the first vector input and the second vector input in accordance with a first portion of a clock signal, means for gating the quadrature (Q) values of the first vector input and the second vector input in accordance with the first portion of the clock signal, means coupled to the in-phase (I) value gating means for determining a logarithm of I (log I), means coupled to the quadrature (Q) value gating means for determining a logarithm of Q (log Q), means coupled to the I gating means and the Q gating means for decoding sign bits of the I value and the Q value to determine a phase of the first vector input and a phase of the second vector input in any quadrant of a complex plane, means coupled to the outputs of the log I determining means, the log Q determining means, and the quadrant decoding means for calculating the difference between the log I and the log Q in accordance with the decoded sign output from the quadrant decoding means, means coupled to the log difference calculating means for selecting a phase proportional to the log difference in accordance with predetermined values stored in the selecting means, means coupled to the selecting means and the quadrant decoding means for storing the phase calculated for the first vector input, means coupled to the phase storing means and the phase selecting means for calculating a difference phase between the stored first vector input phase and a phase of the second vector input in accordance with a second portion of the clock signal, and means coupled to the output of the difference phase calculating means for multiplying the difference phase by a velocity per cycle of phase factor for determining the vector target velocity. Each of the logarithm I determining means, the logarithm Q determining means, and the phase selection means comprises a read-only-memory means. The phase selecting means comprises values stored in a read-only-memory, the values being proportional to a phase difference between one of the selected vector inputs and the start of the quadrant of a complex plane in which the vector occurs.

In accordance with the present invention a method for estimating a radar target velocity comprising the steps of receiving a first vector input generated by processing a plurality of leading sweeps of radar data in a first finite impulse response (FIR) filter means, receiving a second vector input generated by processing a plurality of trailing sweeps of radar data in a second finite impulse response (FIR) filter means, determining the phase difference between corresponding pairs of the first input and the second input, and multiplying the phase difference by a velocity per cycle of phase factor ($V_B$) for determining the radar target velocity. The step of receiving the first vector input comprises data in rectangular coordinates comprising an in-phase value and a quadrature value. The step of receiving the second vector input comprises data in rectangular coordinates comprising an in-phase value and a quadrature value. The step of determining the phase difference comprises the step of computing a phase of the first vector input during a first portion of a clock signal and a phase of the second vector input during a second portion of said clock signal. The step of computing the phases of the first vector input and said second vector input further comprises the step of determining the phases by logarithmic means by solving an identity of PHASE=ARCTAN [ANTILOG (LOG Q−LOG I)]. The step of determining the phases means further comprises the step of determining the phase of the first vector input and the second vector input in any quadrant of a complex plane.

BRIEF DESCRIPTION OF THE DRAWINGS

Other and further features of the invention will become apparent in connection with the accompanying drawings wherein.

DESCRIPTION OF THE PREFERRED EMBODIMENT

Figure 1:
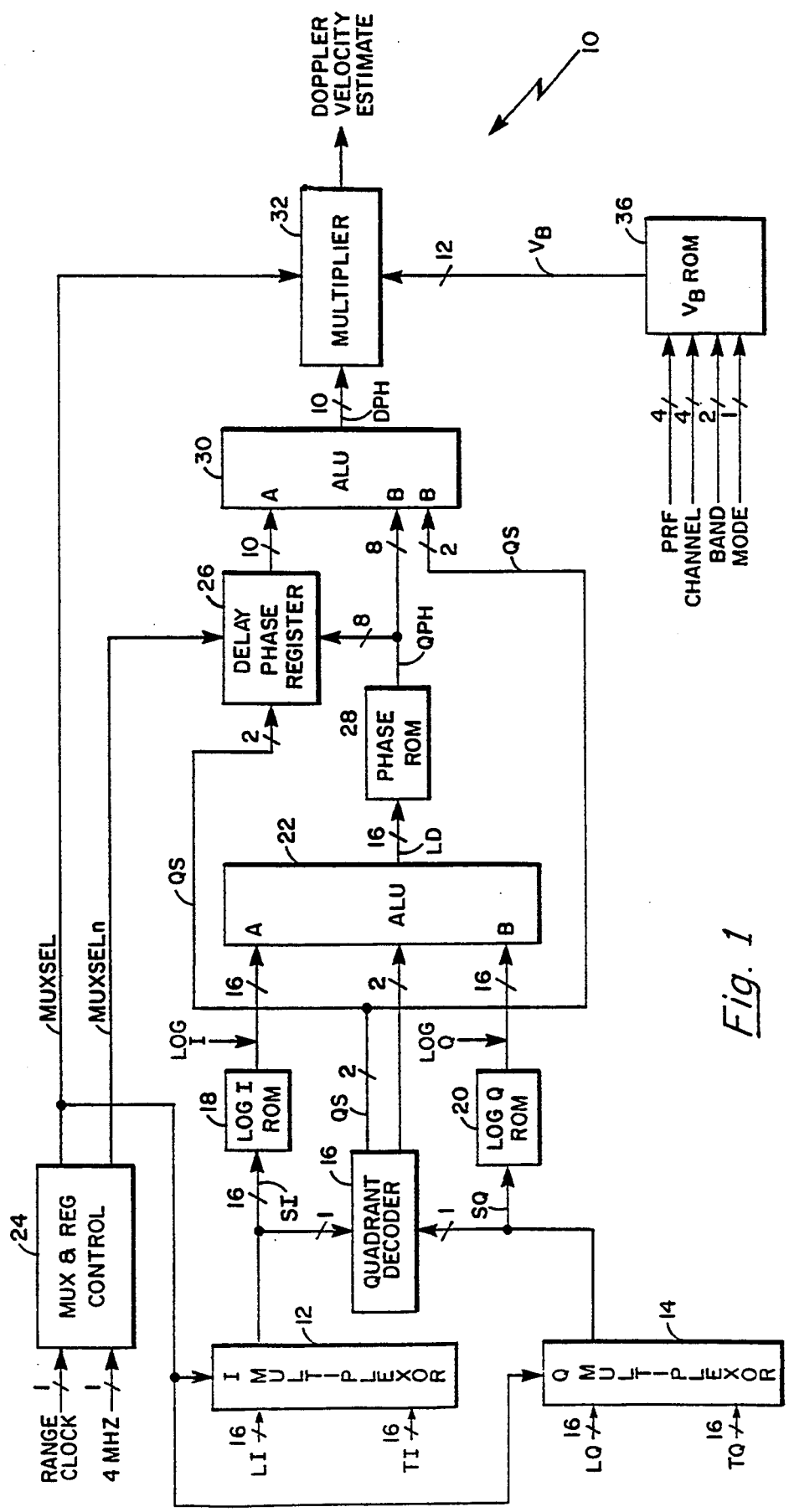
FIG. 1 is a block diagram of a radar target velocity estimator in accordance with the invention.

Referring now to FIG. 1, there is shown a block diagram of the present invention for determining an estimated radial velocity of a radar target. The velocity estimator 10 receives data words from finite impulse response (FIR) filters (known to one of ordinary skill in the art) having outputs referred to as a leading (L) FIR filter output and a trailing (T) FIR filter output. Such outputs represent the Doppler frequency shift and are in rectangular coordinate format where I is the in-phase component and Q is the quadrature component, and the four filter signals are identified as LI, LQ, TI and TQ, each being a 16-bit binary word. The LI and TI inputs to the velocity estimator 10 are coupled to an I multiplexor 12 and the LQ and TQ inputs are coupled to a Q multiplexor 14. Such inputs are clocked into multiplexors 12, 14 by a MUXSEL signal during a range clock period of 1.5 microseconds and from a series of these inputs a Doppler velocity estimate for each filter is obtained.

Figure 2:
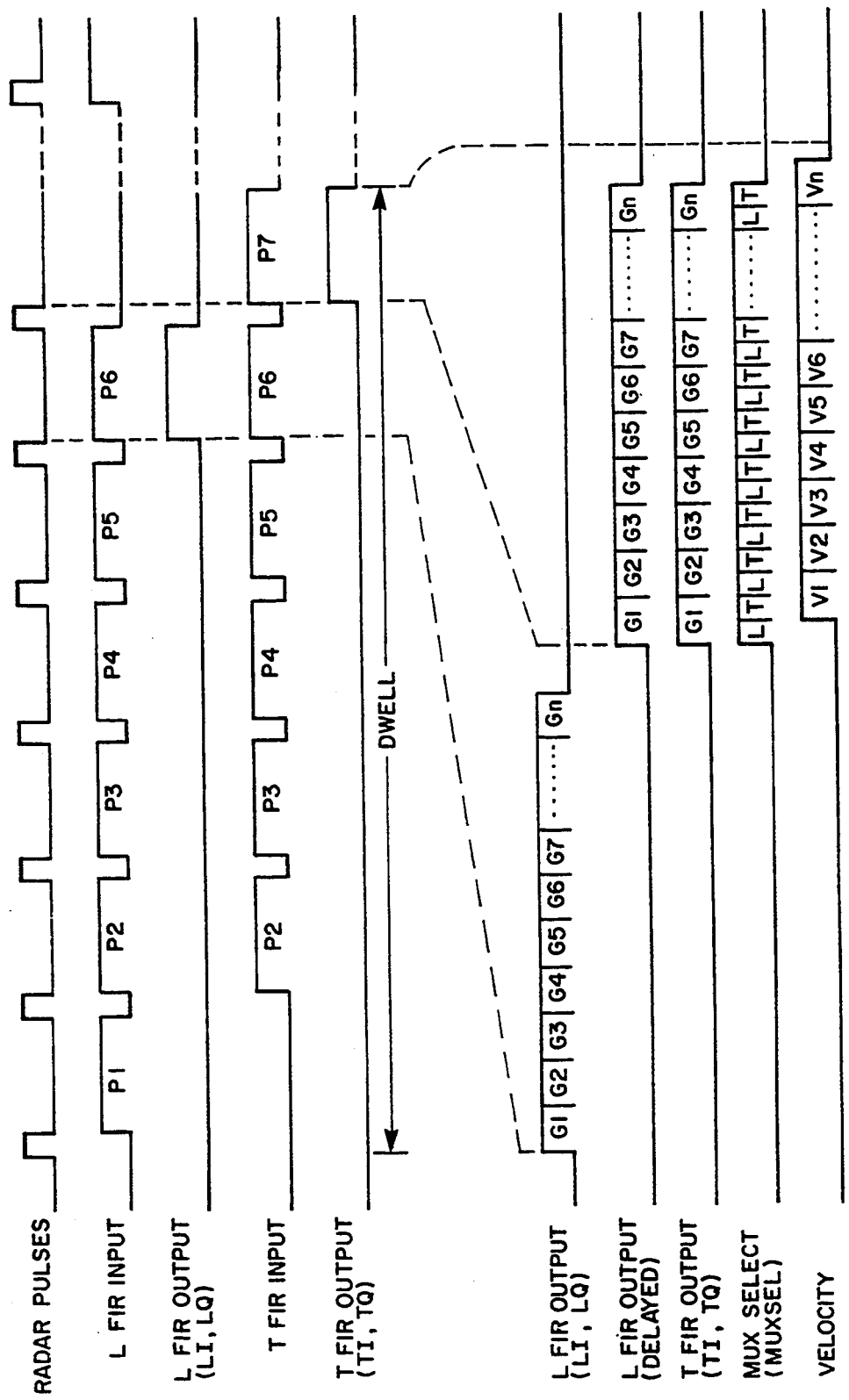
FIG. 2 is a timing diagram of the radar signals processed by the velocity estimator.

Referring now to FIG. 1 and FIG. 2, FIG. 2 is a timing diagram of the signals processed by the velocity estimator 10. To estimate the radial velocity of a detected target, seven sweeps of radar data are gathered per dwell. Sweeps 1–6 are processed through the leading FIR filter. Sweeps 2–7 are processed through the trailing FIR filter. FIG. 2 shows the relative timing relationship of the seven sweeps of radar data gathered per dwell. P6 of the leading (L) FIR input is expanded to show the actual range gate intervals $G_1$ to $G_n$ that occur. Likewise, P7 of the trailing (T) FIR input is expanded to show the L FIR output delayed to line up in time with the T FIR output which shows the range gate intervals $G_1$–$G_n$. The velocity estimator 10 subtracts the phase of each of the filter outputs of sweeps 1–6 from the corresponding phase of sweeps 2–7 producing a phase difference which is proportional to the radial velocity for that range cell. When such phase difference is multiplied by a velocity per cycle of phase factor ($V_B$) which is based on the radar pulse characteristics and the pulse repetition frequency (PRF), the velocity estimate is determined.

In order to obtain the phase of the FIR filter outputs LI, TI, LQ and TQ, the following identity is used:

PHASE=ARCTAN(Q/I)

or in log form,

PHASE=ARCTAN[ANTILOG(LOG Q−LOG I)]

This identity is calculated with the use of logarithm (log) tables which requires that both I and Q components of the complex value be positive. If a vector which represents the complex value falls in a quadrant other than the first quadrant of a complex plane, then at least one of its components is negative. Therefore, it is necessary to rotate such a vector located in another quadrant into the first quadrant. The phase of the rotated vector is calculated and then the angle of rotation is added to obtain the correct phase as shown in Table 1.

TABLE 1

| I | Q | QUADRANT | PHASE |
|---|---|---|---|
| + | + | 1 | ARCTAN (\|Q\|/\|I\|) |
| − | + | 2 | ARCTAN (\|I\|/\|Q\|) + 90 DEG. |
| − | − | 3 | ARCTAN (\|Q\|/\|I\|) + 180 DEG. |
| + | − | 4 | ARCTAN (\|I\|/\|Q\|) + 270 DEG. |

The log of the absolute values $|I|$ or $|Q|$ is obtained from a look-up read-only-memory (ROM) 18, 20 tables. The difference between two accessed values is then obtained through subtraction as indicated in Table 2. The resultant difference is equal to the tangent of the rotated vector's phase (QPH).

TABLE 2

| I | Q | QUADRANT | LOG [TAN QPH] |
|---|---|---|---|
| + | + | 1 | −LOG (\|I\|) + LOG (\|Q\|) |
| − | + | 2 | +LOG (\|I\|) − LOG (\|Q\|) |
| − | − | 3 | −LOG (\|I\|) + LOG (\|Q\|) |
| + | − | 4 | +LOG (\|I\|) − LOG (\|Q\|) |

Another look-up ROM 28 is then used to obtain the Phase of the rotated vector. The appropriate rotation angle value (QS) is then determined by sampling of the signs of the original vector's components and adding the indicated quadrant phase value to the rotated vector's phase value (QPH) to obtain the total phase value (PHASE).

Referring to FIG. 1 and FIG. 2 again, each corresponding pair of leading and trailing FIR filter values comprising the four 16-bit word inputs (LI, LQ, TI, TQ) is provided to the I and Q multiplexors 12, 14 wherein such multiplexors select the leading filter value during the first half of the range clock period of 1.5 microseconds and select the trailing filter value during the final half of the range clock period. A MUX and REG control 24 generates the MUXSEL, MUXSELn signals in accordance with its range clock and 4 $M_hZ$ inputs. The clock signal MUXSEL as shown in FIG. 2 is coupled to I multiplexor 12 and Q multiplexor 14. Each component of the selected filter value (SI, SQ) is used to address 4K word X 16-bit ROMs 18, 20 to obtain a 16-bit LOG I or LOG Q value which is proportional to the log of the component's absolute value as follows:

$$LOG\ I = (2^{15}-1)LOG(|I|)/LOG(2^{15})$$

$$LOG\ Q = (2^{15}-1)LOG(|Q|)/LOG(2^{15})$$

The LOG I and LOG Q outputs from LOG I ROM 18 and LOG Q ROM 20 are coupled to an arithmetic logic unit (ALU) 22 where the log difference (LD) between the two concurrently obtained values is determined. A quadrant decoder 16 is coupled to the ALU 22 and it has as inputs the sign bits of the selected I and Q components (SI and SQ) from the outputs of the I multiplexor 12 and Q multiplexor 14. The quadrant decoder 16 is embodied with an exclusive-or gate for determining the function to be performed by the ALU 22. If both sign bits of SI and SQ are the same (both 0 or both 1), LOG I is subtracted from LOG Q. If the sign bits are different, LOG Q is subtracted from LOG I. The log difference (LD) output from ALU 22 is coupled to PHASE ROM 28. The LD output addresses the 4K word ×8-bit ROM 28 to obtain a quadrant phase value (QPH) that is proportional to the phase difference between the selected filter value and the start of the quadrant in which it is located and QPH is expressed as follows:

$$QPH = 2^7 ARCTAN(2^{SD})/Pi$$

where:

$$SD = 15\ LD/(2^{15}-1)$$

The quadrant in which the selected filter value is located is identified by a 2-bit value (QS) at the output of the quadrant decoder 16. The sign bit of the selected Q component is used as the most significant bit (MSB) of this value which provides an indication of one-half cycle (180 degrees). The other bit is an indication of one-quarter cycle (90 degrees). The phase of the selected filter value in indicated by a 10-bit PH value where the two MSBs are the QS values. The remaining 8-bits are the QPH value generated by PHASE ROM 28. Hence, PHASE=QS+QPH. The QS and QPH values are coupled to the inputs of ALU 30. The QPH value is also coupled to a DELAY PHASE REGISTER 26 which also receives the 2-bit QS, and this register is used to delay each leading PHASE value and then provide it concurrent with the succeeding trailing PHASE value. The 10-bit output of register 26 is coupled to the A input of ALU 30. The ALU 30 is used to subtract each trailing PHASE value from the delayed previous leading PHASE value which provides a difference phase (DPH) value at the ALU 30 output. The DPH value which is determined during the final half of each range clock period is the difference between the PHASE values of a corresponding pair of leading and trailing filter values.

The DPH value is coupled to an X register input of a 12-bit multiplier 32 and transferred at the next range clock pulse. Zeros are used to fill the last two bit positions of this X register. A Y register input of multiplier 32 is coupled to a 12-bit output of a 4K×12-bit $V_B$ ROM 36. The 12-bit $V_B$ output is a velocity per cycle of phase value which when multiplied by DPH at each succeeding range clock pulse (MUXSEL) produces the Doppler velocity estimate. The contents of $V_B$ ROM 36 are determined by the characteristics of a particular radar pulse in accordance with the pulse modulation characteristics and the pulse repetition frequency (PRF). The desired $V_B$ is selected by the digital inputs to $V_B$ ROM 36 described as PRF, CHANNEL, BAND and MODE readily known to one skilled in the art based on a specific radar design.

The ALUs 22, 30 may be embodied by 54LS381 integrated circuits and the multiplexors 12, 14 may be embodied by 54LS157 integrated circuits as manufactured by Texas Instruments and the multiplier 32 may be embodied by an MPY112K integrated circuit as manufactured by TRW, both of which are readily known to one skilled in the art.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. An apparatus for estimating a radar target velocity comprising:
   a first vector input generated by processing a plurality of leading sweeps of radar data in a first finite impulse response (FIR) filter means;
   a second vector input generated by processing a plurality of trailing sweeps of radar data in a second finite impulse response (FIR) filter means;
   means, coupled to said first vector input and said second vector input for determining the phase difference between corresponding pairs of said first vector input and said second vector input, said phase of said first vector input and said second vector input being determined by logarithmic means for solving an identity of PHASE=ARCTAN [ANTILOG (LOG Q—LOG I)]; and
   means coupled to said phase difference determining means for multiplying said phase difference by a velocity per cycle of phase factor ($V_B$) for determining said radar target velocity.

2. The velocity estimating apparatus as recited in claim 1 wherein:
   said first vector input comprises data in rectangular coordinates comprising an in-phase value and a quadrature value.

3. The velocity estimating apparatus as recited in claim 1 wherein:
   said second vector input comprises data in rectangular coordinates comprising an in-phase value and a quadrature value.

4. The velocity estimating apparatus as recited in claim 1 wherein:
   said phase difference determining means computes said phase of said first vector input during a first portion of a clock signal and said phase of said second vector input during a second portion of said clock signal.

5. The velocity estimating apparatus as recited in claim 1 wherein said phase determining means further comprises decoding means for determining the phase of said first vector input and said second vector input for any quadrant of a complex plane.

6. An apparatus for estimating a radar target velocity comprising:
   a first vector input having an in-phase (I) value and a quadrature (Q) value generated by processing a plurality of leading sweeps of radar data in a first finite impulse response (FIR) filter means;

a second vector input having an in-phase value and a quadrature (Q) value generated by processing a plurality of trailing sweeps of radar data in a second finite impulse response (FIR) filter means;

means for gating said in-phase (I) values of said first vector input and said second vector input in accordance with a first portion of a clock signal;

means for gating said quadrature (Q) values of said first vector input and said second vector input in accordance with said first portion of said clock signal;

means coupled to said in-phase (I) value gating means for determining a logarithm of I (log I);

means coupled to said quadrature (Q) value gating means for determining a logarithm of Q (log Q);

means coupled to said I gating means and said Q gating means for decoding sign bits of said I value and said Q value to determine a phase of said first vector input and a phase of said second vector input in any quadrant of a complex plane;

means coupled to the outputs of said log I determining means, said log Q determining means, and said quadrant decoding means for calculating the difference between said log I and said log Q in accordance with the decoded sign output from said quadrant decoding means;

means coupled to said log difference calculating means for selecting a phase proportional to said log difference in accordance with predetermined values stored in said selecting means;

means coupled to said selecting means and said quadrant decoding means for storing said phase calculated for said first vector input;

means coupled to said phase storing means and said phase selecting means for calculating a difference phase between said stored first vector input phase and a phase of said second vector input in accordance with a second portion of said clock signal; and means coupled to the output of said difference phase calculating means for multiplying said difference phase by a velocity per cycle of phase factor for determining said vector target velocity.

7. The velocity estimating apparatus as recited in claim 6 wherein each of said logarithm I determining means, said logarithm Q determining and said phase selection means comprises a read-only-memory means.

8. The velocity estimating apparatus as recited in claim 6 wherein said phase selecting means comprises values stored in a read-only-memory, said values being proportional to a phase difference between one of said selected vector inputs and the start of the quadrant of a complex phase in which said vector occurs.

9. A method for estimating a radar target velocity comprising the steps of:
receiving a first vector input generated by processing a plurality of leading sweeps of radar data in a first finite impulse response (FIR) filter means;
receiving a second vector input generated by processing a plurality of trailing sweeps of radar data in a second finite impulse response (FIR) filter means;
computing a phase of said first vector input and a phase of said second vector in input by logarithmic means solving an identity of PHASE=ARCTAN [ANTILOG (LOG Q−LOG I)];
determining the phase difference between corresponding pairs of said first vector input and said second vector input; and multiplying said phase difference by a velocity per cycle of phase factor ($V_B$) for determining said radar target velocity.

10. The method as recited in claim 9 wherein said step of receiving said first vector input comprises data in rectangular coordinates comprising an in-phase value and a quadrature value.

11. The method as recited in claim 9 wherein said step of receiving said second vector input comprises data in rectangular coordinates comprising an in-phase value and a quadrature value.

12. The method as recited in claim 9 wherein said step of determining said phase difference comprises the step of computing said phase of said first vector input during a first portion of a clock signal and said phase of said second vector input during a second portion of said clock signal.

13. The method as recited in claim 9 wherein said step of determining said phase of said first vector input and said phase of said second vector input further comprises the step of determining the phase of said first vector input and said second vector input in any quadrant of a complex plane.

14. An method for estimating a radar target velocity comprising the steps of:
receiving a first vector input having an in-phase (I) value and a quadrature (Q) value generated by processing a plurality of leading sweeps of radar data in a first finite impulse response (FIR) filter means;
receiving a second vector input having an in-phase value and a quadrature (Q) value generated by processing a plurality of trailing sweeps of radar data in a second finite impulse response (FIR) filter means;
gating said in-phase (I)fvalues of said first vector input and said second vector input in accordance with a first portion of a clock signal;
gating said quadrature (Q) values of said first vector input and said second vector input in accordance with said first portion of said clock signal;
determining a logarithm of I (log I) received from said in-phase (I) value gating means;
determining a logarithm of Q (log Q) received from said quadrature (Q) value gating means;
decoding sign bits of said I value and said Q value to determine a phase of said first vector input and a phase of said second vector input in any quadrant of a complex plane by means coupled to said I gating means and said Q gating means;
calculating the difference between said log I and said log Q in accordance with the decoded sign output from said quadrant decoding means with means coupled to the outputs of said log I determining means, said log Q determining means, and said quadrant decoding means;
selecting a phase proportional to said log difference in accordance with an output from said log difference calculating means and predetermined values stored in said selecting means;
storing said phase calculated for said first vector input with means coupled to said selecting means and said quadrant decoding means;
calculating a difference phase between said stored first vector input phase and a phase of said second vector input coupled from said phase selecting means in accordance with a second portion of said clock signal; and
multiplying said difference phase by a velocity per cycle of phase factor for determining said vector target velocity estimate.

* * * * *